United States Patent [19]

Gordebeke

[11] Patent Number: 4,480,329
[45] Date of Patent: Oct. 30, 1984

[54] DIAGNOSTIC ROUTINE SELECTOR AND DISPLAY

[75] Inventor: John H. Gordebeke, Aj Venlo, Netherlands

[73] Assignee: Xerox Corporation, Stamford, Conn.

[21] Appl. No.: 363,708

[22] Filed: Mar. 30, 1982

[30] Foreign Application Priority Data

Mar. 31, 1981 [GB] United Kingdom ............... 8110040

[51] Int. Cl.³ .......................................... G06F 11/00
[52] U.S. Cl. ...................................... 371/20; 371/15
[58] Field of Search ................. 371/15, 20; 355/14 C

[56] References Cited

U.S. PATENT DOCUMENTS

| | | | |
|---|---|---|---|
| 3,870,295 | 3/1975 | Kukucka | 271/173 |
| 4,158,432 | 6/1979 | van Bavel | 371/20 |
| 4,158,886 | 6/1979 | Gray, Jr. et al. | 364/518 |
| 4,161,277 | 7/1979 | Steiner | 235/304 |
| 4,162,396 | 7/1979 | Howard et al. | 371/20 |
| 4,186,299 | 1/1980 | Batchelor | 235/304.1 |
| 4,204,670 | 5/1980 | Traister | 271/287 |
| 4,206,995 | 6/1980 | Legg | 355/14 C |
| 4,266,294 | 5/1981 | Daughton et al. | 371/24 |

Primary Examiner—Charles E. Atkinson
Assistant Examiner—Mark Ungerman
Attorney, Agent, or Firm—Ronald F. Chapuran

[57] ABSTRACT

In a stand-alone or add-on sorter for a reproduction machine, the sorter has access to its own collection of diagnostic programs under control of a single push button carried on the sorter housing. A lamp associated with the push button is used to indicate, as by its frequency of pulsing, the diagnostic state of the machine, and a manually-operable switch is used to move the sorter between its normal and diagnostic modes. When in its stand-alone configuration, the number of successive sorting operations to be carried out by the sorter, before returning to its home position, is controlled by the number of successive operations of the push button, with the switch being in its normal position.

5 Claims, 6 Drawing Figures

DIAGNOSTIC ROUTINE SELECTOR AND DISPLAY

BACKGROUND OF THE INVENTION

1. Field of the Invention

This invention relates to electrical equipment having diagnostics, and particularly to such equipment intended to be an accessory to another machine producing output on which the accessory operates.

The present invention has been made in connection with a document sorter intended to be combined with, or added to, a reproduction machine having its output in the form of sheets of paper or like copy media.

2. Prior Art

Known reproduction machines incorporate a microprocessor having several diagnostic programs available selectively to the machine operator or service personnel. It is known to use the usual keyboard of the machine to select a particular program, by allocating a particular number to each diagnostic program and selecting it by actuation of the key or keys bearing that number, with the usual diaplay panel displaying the number (or an equivalent alphanumeric symbol) of the program selected. The present invention aims at providing an accessory to such a machine with its own diagnostics and with a minimum of additional components dedicated to the diagnostics.

SUMMARY OF THE INVENTION

Accordingly the present invention provides an accessory with selfdiagnostic capabilities which is as claimed in the appended claims.

BRIEF DESCRIPTION OF THE DRAWINGS

The present invention will now be described by way of example with reference to the accompanying drawings, in which.

Figure 1:
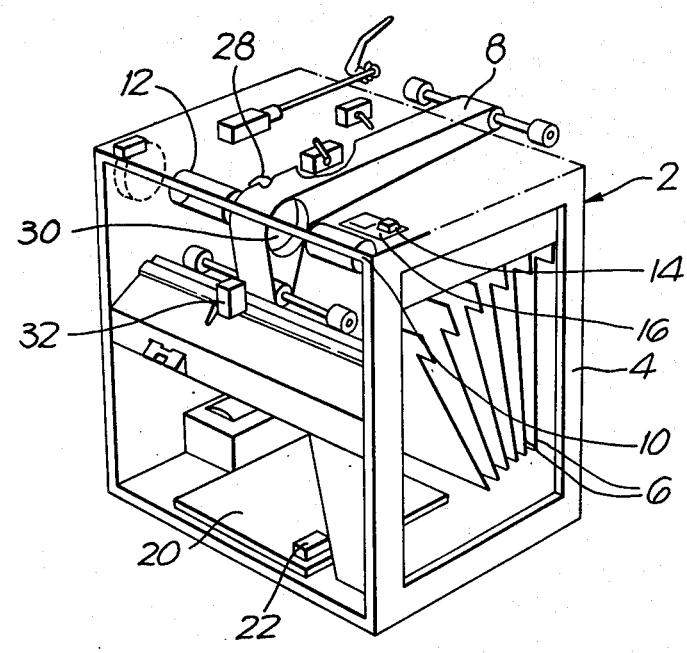
FIG. 1 is a diagrammatic perspective view of a five-bin sorter incorporating the present invention.

The sorter 2 shown in FIG. 1 is intended to be attached mechanically to the respective output side panel of a reproduction machine (not shown) by means of hooks or other devices (not shown) protruding from the hidden major face thereof and is coupled independently to a source of electricity (not shown) by which the various components of the sorter are powered.

The reproduction machine produces output in the form of sheets of paper, film or other copy media, the sheets usually being fed long side first to a horizontal delivery slot in a vertical side face different from that against which the operator usually stands to operate the copier, The sorter 2 includes a chassis 4 normally having its major faces covered by panels, which are shown as having been removed to show more clearly the arrangement of internal components of the sorter, and to show the sorter when its interior is accessible for maintenance or repair.

When mechanically attached to a reproduction machine, copy sheets from the machine pass in succession to a gate forming part of the sorter. When the sorter is in a non-sort mode, the gate is in a position in which the copy sheets are fed sequentially on to the top cover of the sorter, which acts as a catch tray. When the sorter is in its sort mode, in which it feeds successive copy sheets into the respective number of adjacent sorter pockets defined by pairs of bin plates 6, the gate is moved to a position in which it feeds the copy sheets successively into contact with a travelling belt 8 driven by a transport motor 10.

Extending from the top plate of the sorter housing is the operating member of a sorter select switch 14. Adjacent to it, and readily visible by someone standing close to the sorter, is a window 16, normally coloured red, behind which is situated a light-emitting diode 18 (not shown in FIG. 1) the significance of which will be discussed below.

Figure 2:
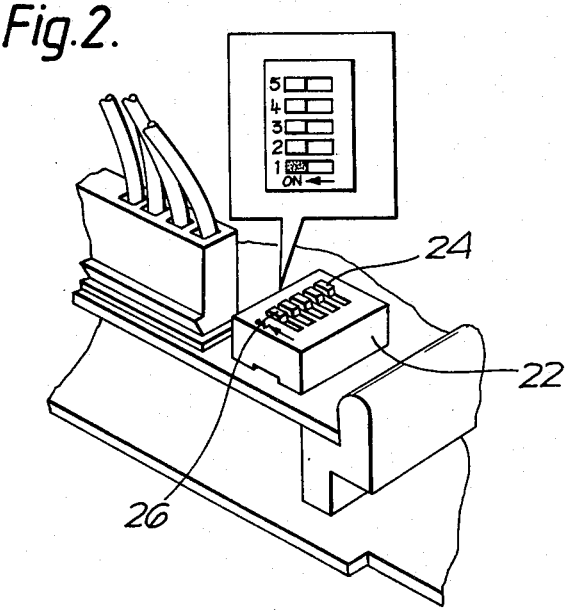
FIG. 2 is a diagrammatic perspective view of part of the apparatus shown in FIG. 1, drawn to a larger scale to show the diagnostics select switch more clearly.

Situated on a printed wire board 20 at the base of the machine, and therefore accessible when the respective panel has been removed, is a program switch 22, shown more clearly in FIG. 2. As this latter figure illustrates, the switch housing has projecting from it the operating members 24 of five switches. The operating members may be of the push-button type, of the sliding type, or of the rocking type. The switch nearest the operator is dedicated to selecting the diagnostic mode of the sorter. When in its inactive position the sorter operates under the control of switch 14. When the respective switch 26 is operated it makes a predetermined set of diagnostic programs available to the operator or service engineer. When in this mode, successive operations of the switch 14 enable the particular diagnostic program of interest to be selected. The service engineer has available to him a 'menu' of diagnostic programs, each having associated with it a single-digit code number. For example, the operation of switches on the inlet side of the sorter can be checked by depressing the button 14 the number of times indicated by the following table.

| Switch | Code |
|---|---|
| Index | 1 |
| Home | 2 |
| Sorter entrance | 3 |
| Bin entrance | 4 |
| sorter select | 5 |
| logic interlock | 6 |

The outlet side of the sorter can be tested by use of the following codes:

| Function tested | Code |
|---|---|
| System solenoid | 7 |
| Sorter drive | 8 |

When the switch 14 is operated nine times or more in succession, the sorter goes through a predetermined dynamic test route in which the inter-relationship of various components of the sorter is checked.

The circuitry of the present invention causes the LED 18 to flash at one of two significantly-different rates to show the current status of the machine when in its diagnostic mode. It emits about ten pulses per second (PPS) when the sorter is in its diagnostic mode and no particular program has been selected. After operation of switch 14 the number of times corresponding to the coded program, and the user has waited for about two seconds after the last depression of switch 14, the LED 18 emits about two-three pulses per second as an indication that the respective code has been accepted.

Upon the selected switch being actuated, the LED changes from its slow pulse rate to give a steady light if the switch functioned properly. Malfunctioning of the switch is indicated by either the LED continuing to flash at a slow rate, or upon its ceasing to light up, which then directs the attention of the user to the particular component.

When testing the sorter drive, by selecting code 8, in one form of the present invention a stroboscopic lamp 28 directs light on the inner side of the main drive wheel 30 for the belt 8. The wheel is provided with the usual stroboscopic marks, related to the frequency of pulses from lamp 28, so that when the wheel 30 is rotating at the correct speed, the marking pattern appears to be stationary. Rotation at a speed other than the designed speed is corrected by means of a potentiometer (not shown) inserted in the supply side of motor 10, so that the apparent rotation of the marking pattern is counteracted and it again appears to be stationary.

When the dynamic test routine is selected by the input of code 9, the system solenoid (not shown) lifts the inlet baffle and the sorter drive motor 10 is energised, if the sorter is in its 'home' position. Otherwise, an index motor 12 is energized to return the sorter to its home positin. Once in its home position, copy sheets can be fed to the sorter either by hand or mechanically. Every time a copy sheet passes a bin entry switch 32, the sorter is indexed by one bin unless the copy sheet keeps the bin entrance switch 32 closed for more than 0.55 s. If this occurs, the sorter is switched back automatically to the start of the diagnostic mode, deactuating the system solenoid and the sorter drive or index motors, and the diagnostic code has to be selected again. This is to prevent the sorter from being damaged by continuing to feed copies to the bins while a copy is jammed in the bin entrance area, indicated by continued closure of the bin entrance switch.

When the sorter aligns the fifth bin with the outlet slot of the copy sheet path, the direction of rotation of the index motor 12 is automatically reversed, so that after the trailing edge of the next copy sheet has been detected by the bin entrance switch 32, the five bins will be indexed in the reverse direction until the first bin becomes realigned with the entry slot, whereupon the direction of rotation of the index motor 12 is again reversed and with it, the direction of movement of the fanned-out set of bins.

When a diagnostic test has been carried out, and it is desired to carry out another one, it is first necessary to return switch 26 to its 'off' position. The next diagnostic routine is then selected by repeating the cycle described above.

Figure 3:
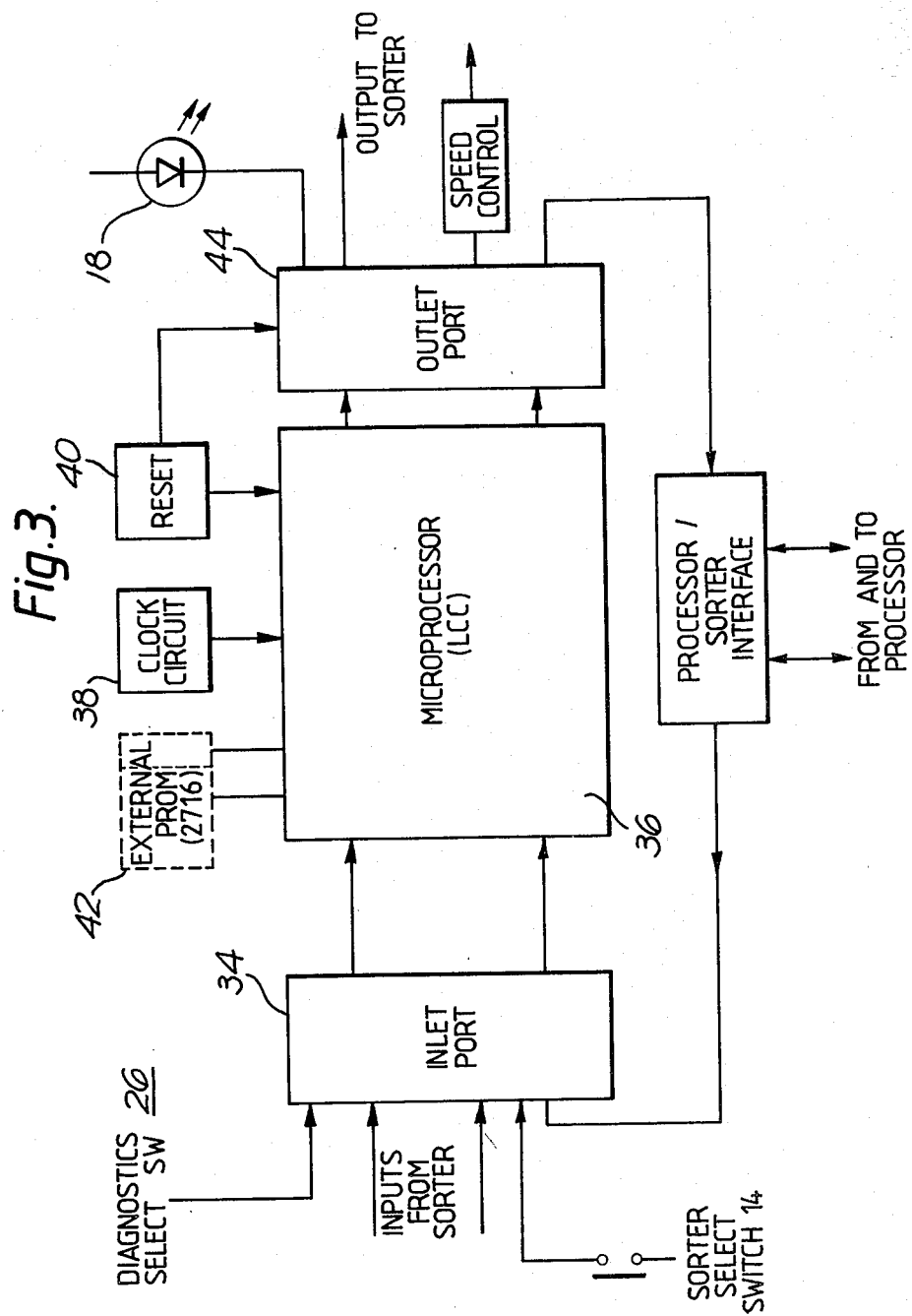
FIG. 3 is a schematic block diagram of the interconnected components used to put the present invention into effect.

The present inventin is put into effect by a relatively-simple modification to the normal control circuitry of the sorter, as shown in FIG. 3. The diagnostic select switch 26 and the sorter select switch 14 are coupled into a ganged inlet port 34 arranged to feed into a microprocessor 36 having input from a clock circuit 38 and a reset circuit 40, and bidirectional communication with an external programmable read-only memory (PROM) 42. It is PROM 42 which has stored in it the portfolio of diagnostic programs.

The microprocessor 36 feeds to a ganged outlet port 44 supplying an output when appropriate to LED 18.

Figure 4:
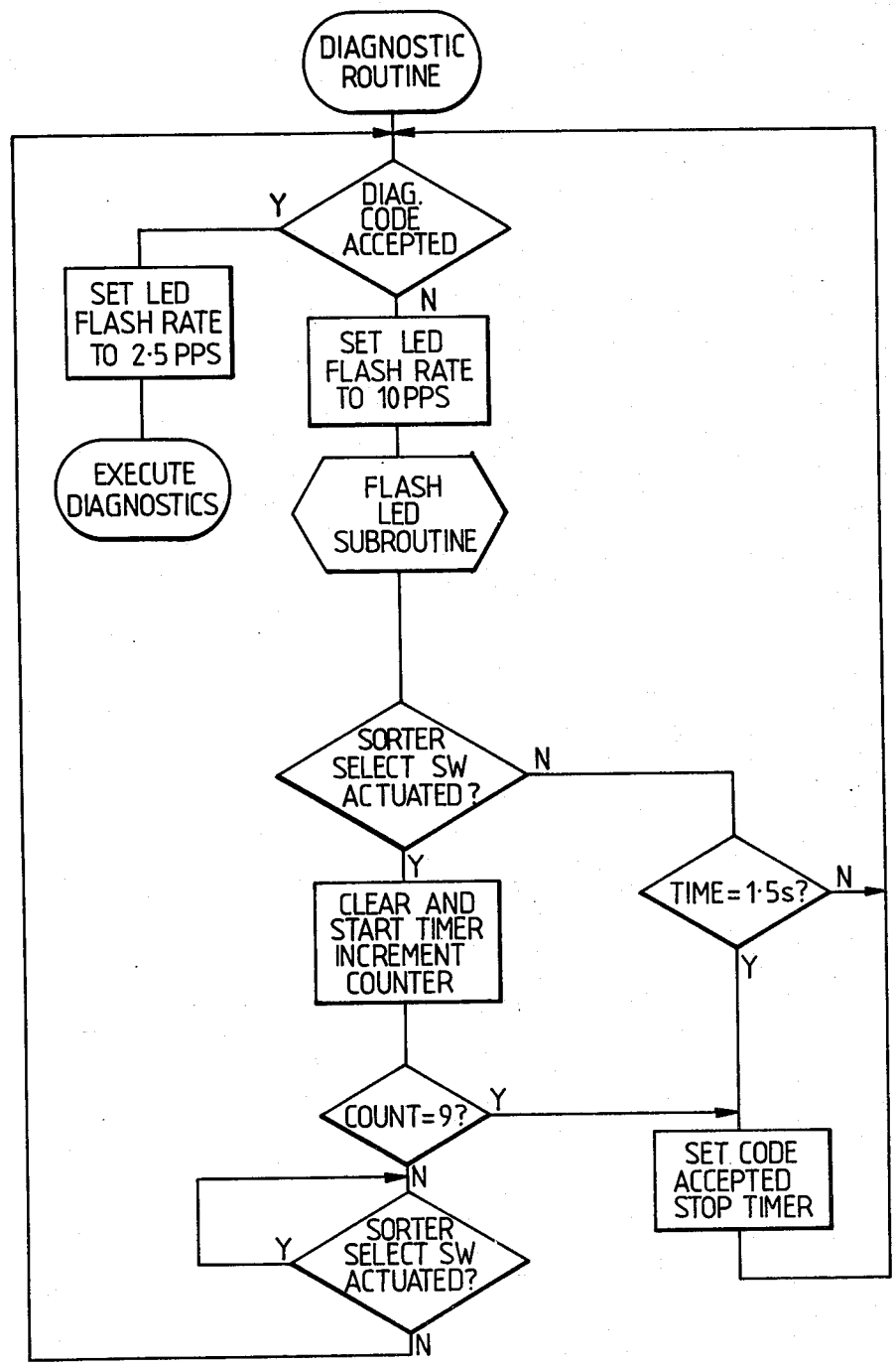
FIGS. 4 to 6 are logical diagrams showing the steps to be followed respectively for the diagnostic routine, the execute dianostics routine, and the dynamic test routine.
Figure 5:
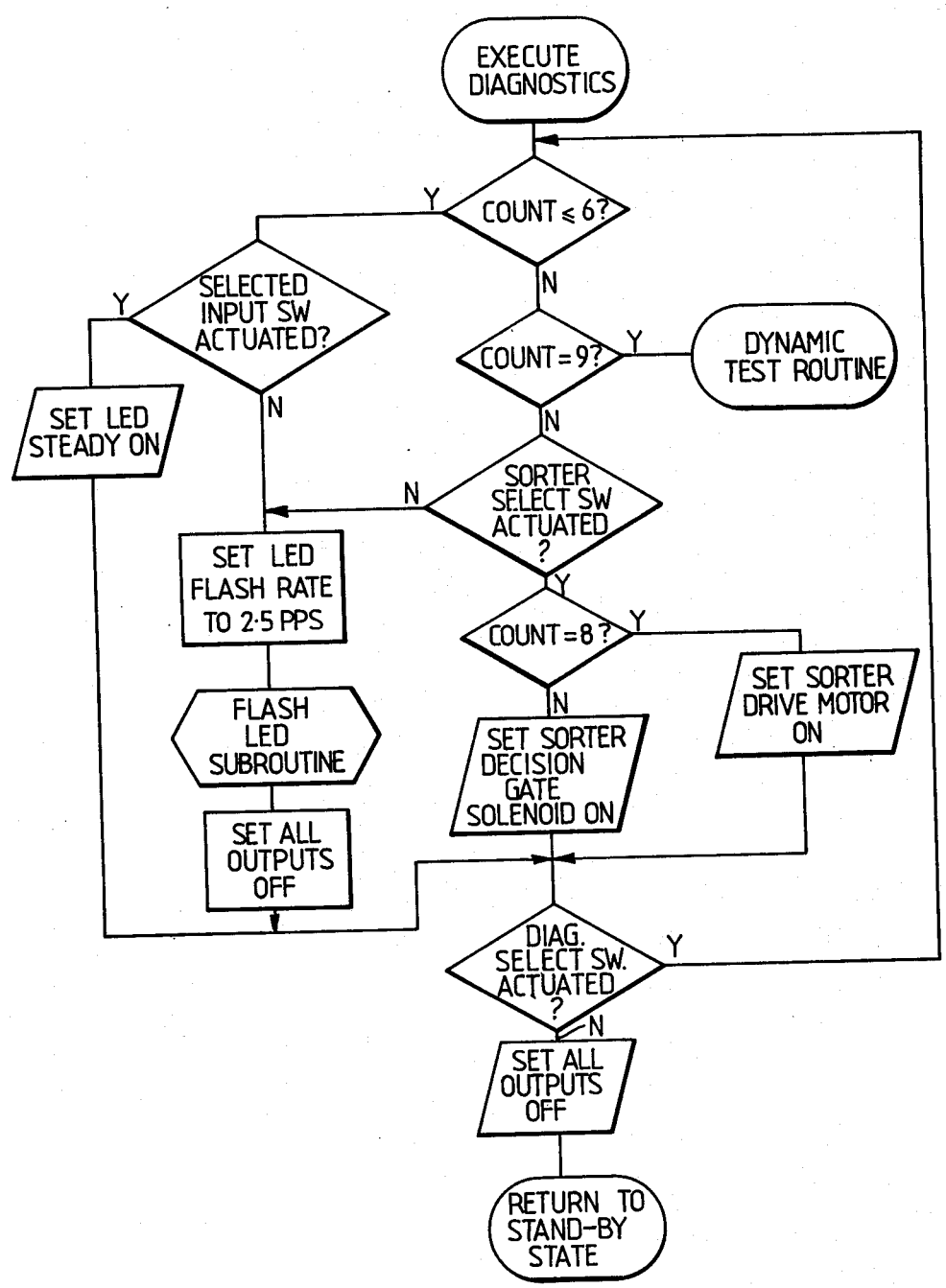
Figure 6:
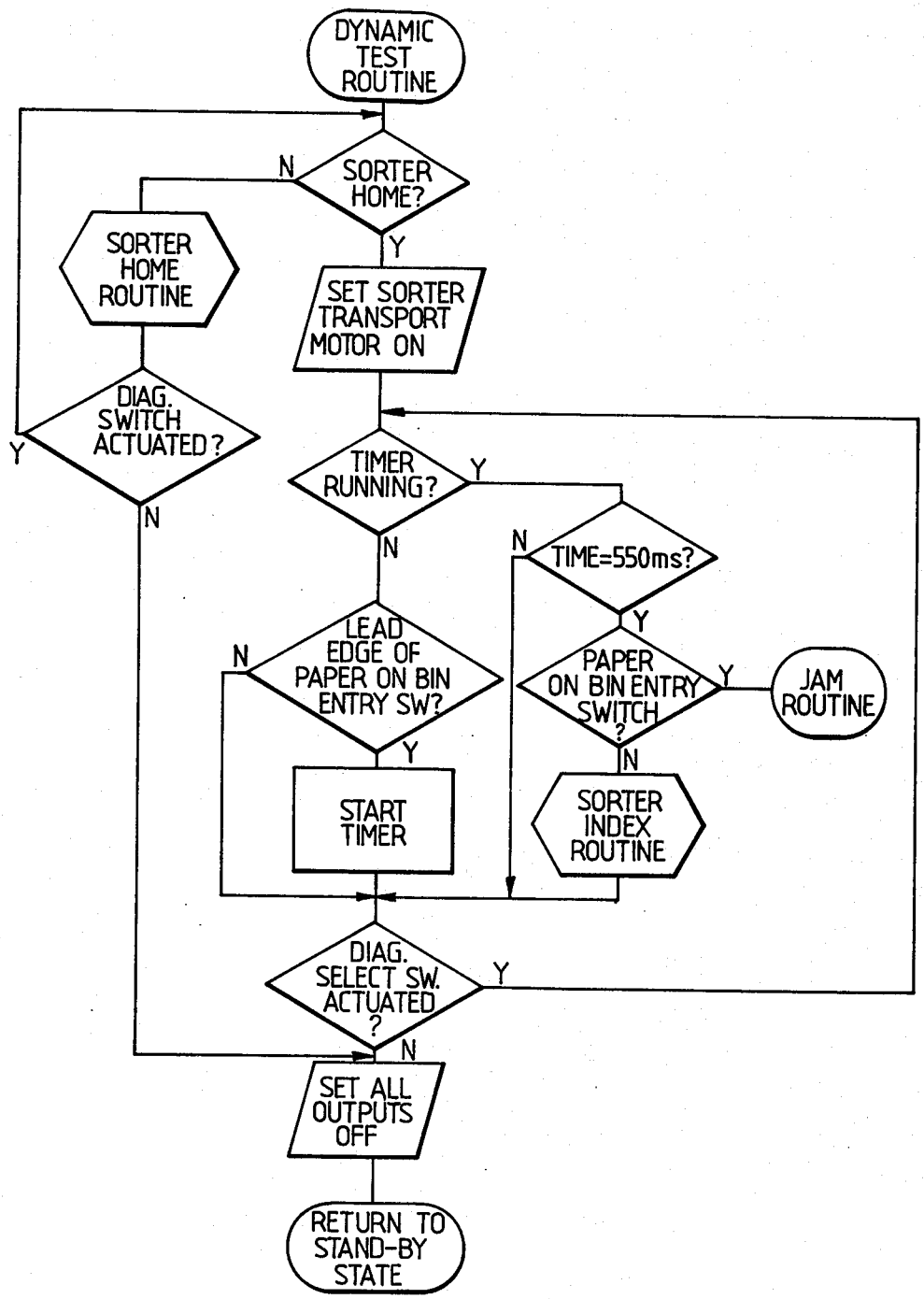

The different components shown diagrammatically in FIG. 3 are interconnected in a way which would be obvious to an experienced control engineer supplied with the logic diagrams of FIGS. 4–6, and so is not described herein in any further detail.

The logic diagram shown in FIG. 4 illustrates the diagnostic routine. When the switch 26 has been operated, and the sorter select button 14 pressed, the logic asks itself if a diagnostic code has been selected, as indicated by the passage of more than 1.5 seconds since the last depression of switch member 14. Until this period has elapsed, the LED 16 is set to flash at a rate of ten PPS, whereas when the code has been selected, the flash rate is set to the lower rate of about 2.5 PPS.

When the apparatus indicates that a diagnostic code has been accepted, the apparatus is able to be switched into its 'execute diagnostics' routine, as shown in FIG. 5. This is deferred until after the code has been accepted. Once this has happened, the timer (which is set to run by actuation of switch member 14) is stopped and reset, as happens to the counter which is incremented by actuation of switch member 14. When a set code has been accepted, the reading on the counter dictates which particular diagnostic program is made effective. The system can reverts to carrying out the execution step shown in FIG. 5.

When the count on the counter is equal to or less than six, indicating that the function to be tested is the operation of the switch on the input side of the sorter, the system asks whether or not the selected switch has been actuated. Once it has been, the LED 16 is caused to emit light continuously, and until this has happened, the flash rate of the LED is kept at its slower frequency, only reverting to being on continuously by actuation of the selected switch.

When the count is seven or eight, this indicates that the sorter select button 14 of the sorter is having its actuation monitored. When the count is eight, the sorter drive motor is energised and the operation of that is monitored. After the output functions have been monitored, then all the outputs of the apparatus are returned to zero and the apparatus is put into its stand-by state.

When the counter reaches the count of nine, the second decision gate switches the apparatus into the dynamic test routine, shown in FIG. 6.

When in this routine, the position of the sorter is interrogated. If it is not at home, then the sorter index motor is energised to return the sorter to its home position, after which the machine sets the transport motor on and awaits the supply of a copy sheet to the inlet of the sorter. The arrival of this operates the bin entry switch which starts a timer which acts to check that the bin entry switch has been reopened after about 550 ms, which corresponds to the longest foreseeable time that it would take for a copy sheet to enter the sorter. If the bin entry switch remains operated for longer than this period, this is interpreted as meaning that paper has become jammed in the sorter entrance, and the machine is switched into its jam routine.

Assuming that the paper has not been jammed, then the sorter is automatically indexed in both directions to enable its operation to be monitored. When the sorter has been checked completely, and no paper jams have occurred, then the apparatus has all its outputs set to zero and the machine is returned to its stand-by state.

It will thus be seen that the present invention provides an accessory having its own self-diagnostic facilities, which may be powered independently from the machine to which it is an accessory, using simple bi-functional components which can be operated in coded fashion to select one at a time of a portfolio of diagnostic programs.

What we claim is:

1. In a reproduction machine for producing impressions of an original, the reproduction machine having a photosensitive member and a plurality of discrete operating components cooperable with one another and the photosensitive member to produce the impressions on copy paper, and including an accessory for operating on the copy sheet, the accessory comprising a controller storing several diagnostic procedures, the controller including a microprocessor and a memory, a first switch connected to the microprocessor, the first switch settable into either a normal or diagnostic position, a second switch connected to the microprocessor, the second switch controlling operation of the accessory, and means responsive to the first switch in the diagnostic position for causing selective operation of the second switch to make diagnostic procedures available in sequence, a given procedure being initiated automatically upon lapse of a given time period after selective operation of the second switch without further actuation of the second switch.

2. An accessory as claimed in claim 1, in which the accessory includes a mode indicator connector to the microprocessor for indicating when the necessary is in its diagnostic mode, and for indicating when a selected operation of the second switch has been validated.

3. An accessory as claimed in claim 1, in which the mode indicator is a lamp for emitting pulsating or continuous light to indicate different diagnostic states of the accessory.

4. An accessory as claimed in claim 1, in which the lamp includes means to pulse at one frequency to indicate when the accessory is in its diagnostic mode, and means to pulse at another frequency when a choice of a diagnostic procedure has been accepted by the accessory.

5. An accessory as claimed in claim 1, when used as a sorter for a succession of copy sheets, in which, when the first switch is in its normal position, the number of successive sorting operations to be carried out by the sorter before it returns to its start position is dictated by the number of successive actuations to the second switch.

* * * * *